(12) United States Patent
Lester et al.

(10) Patent No.: US 9,984,688 B2
(45) Date of Patent: May 29, 2018

(54) DYNAMICALLY ADJUSTING A VOICE RECOGNITION SYSTEM

(71) Applicants: Brian Lester, Livonia, MI (US); Sorin M. Panainte, Holland, MI (US)

(72) Inventors: Brian Lester, Livonia, MI (US); Sorin M. Panainte, Holland, MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days. days.

(21) Appl. No.: 15/278,632

(22) Filed: Sep. 28, 2016

(65) Prior Publication Data

US 2018/0090139 A1 Mar. 29, 2018

(51) Int. Cl.
*G10L 15/04* (2013.01)
*G10L 15/22* (2006.01)
*G10L 15/08* (2006.01)
*G10L 15/10* (2006.01)

(52) U.S. Cl.
CPC .............. *G10L 15/22* (2013.01); *G10L 15/08* (2013.01); *G10L 15/10* (2013.01); *G10L 2015/088* (2013.01); *G10L 2015/223* (2013.01); *G10L 2015/225* (2013.01)

(58) Field of Classification Search
CPC ......... G10L 15/30; G10L 15/22; G10L 15/26; G10L 2015/088; G10L 15/265; G10L 17/06; G10L 15/20; G10L 15/063; G10L 15/00; G10L 15/32; G10L 2015/228; G10L 25/48; G10L 15/065; G10L 17/22; G10L 19/005; G10L 2015/0635; G10L 15/10; G10L 15/1815; G10L 15/183
USPC ..... 704/1–10, 233, 230, 250, 251, 255, 257, 704/270, 270.1
See application file for complete search history.

(56) References Cited

U.S. PATENT DOCUMENTS

| | | | |
|---|---|---|---|
| 6,308,155 B1 | 10/2001 | Kingsbury et al. | |
| 7,953,898 B2 | 5/2011 | Brown | |
| 8,032,372 B1 | 10/2011 | Zimmerman et al. | |
| 8,145,485 B2 | 3/2012 | Brown | |
| 8,612,225 B2 | 12/2013 | Arakawa et al. | |
| 2008/0167872 A1* | 7/2008 | Okimoto | G10L 15/22 704/251 |
| 2011/0184730 A1* | 7/2011 | LeBeau | G10L 15/30 704/201 |
| 2011/0202341 A1 | 8/2011 | Brown | |
| 2011/0276331 A1 | 11/2011 | Yamazaki et al. | |
| 2012/0239401 A1 | 9/2012 | Arakawa | |
| 2014/0278415 A1 | 9/2014 | Ivanov et al. | |

* cited by examiner

*Primary Examiner* — Huyen Vo (74) *Attorney, Agent, or Firm* — Dickinson Wright PLLC (57) ABSTRACT

A system for dynamically adjusting a voice recognition system is provided herein. The system employs a methodology for determining a display associated with a disambiguation window, with the determination employing a detection system scoring to display disambiguation based on the vocal clarity of the speaker and other environmental factors that may affect detection.

2 Claims, 8 Drawing Sheets

DYNAMICALLY ADJUSTING A VOICE RECOGNITION SYSTEM

BACKGROUND

Electronic systems employ interfaces to interact with the systems. The interfaces range from a variety of contact and contactless techniques, such as keyboards, buttons, pointer devices, and the like. In recent time, these interfaces may even employ cameras capable of detecting an image or video associated with a user's action.

Recently, audio-based interfaces have become more common. A recording device processes sound, with the sound being interpreted via various digital signal processing techniques to correlate to a textual-based command. Once a text-based command is identified, the exact text can be then employed to perform a control operation associated with the electronic system.

In these techniques, various problems often occur that frustrate the employment of text-based technologies. For example, the clarity of the text-based inputs may be compromised due to environmental conditions, such as, weather and background sound. As such, an electronic system employing an audio recording input mechanism may not be able to interpret the text-based command with the accuracy required to properly interact with the electronic system.

In other cases, the employment of an audio-based interface may also be frustrated by variations in pronunciation, accents, dialects, and vocal clarity. As such, employing an audio-based interface may also be frustrated based on the variations noted above, as the audio-based interface may be incapable of providing an accurate detection of the spoken command.

To address the above, the spoken command may be augmented with disambiguation. Disambiguation detects the spoken command, and provides a list of options associated with the spoken command. The list of options may be presented based on what the processor associated with the detection predicts the spoken command to be, and a predetermined number of other commands related to the predicted command.

Figure 1:
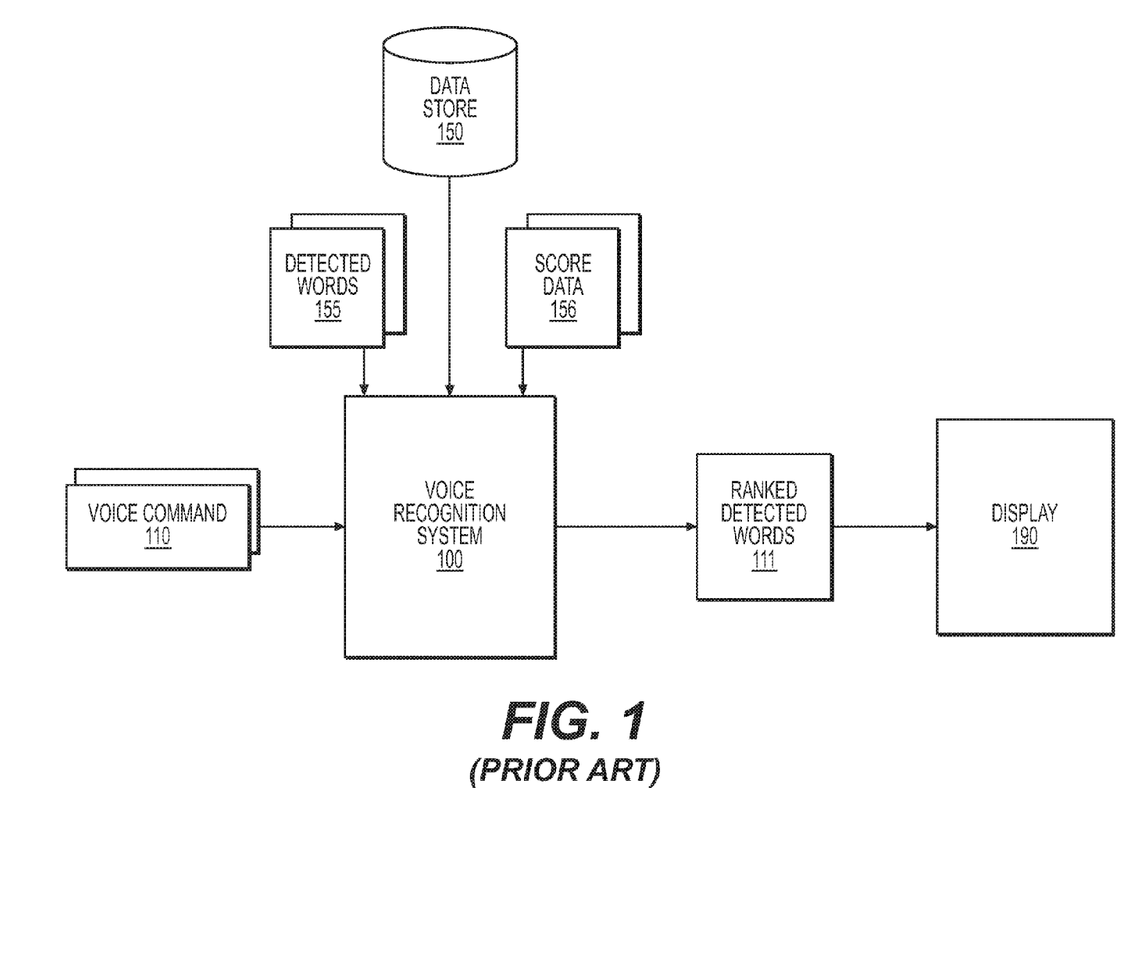
FIG. 1 illustrates an example of a system employing disambiguation according to the prior art.
Figure 2:
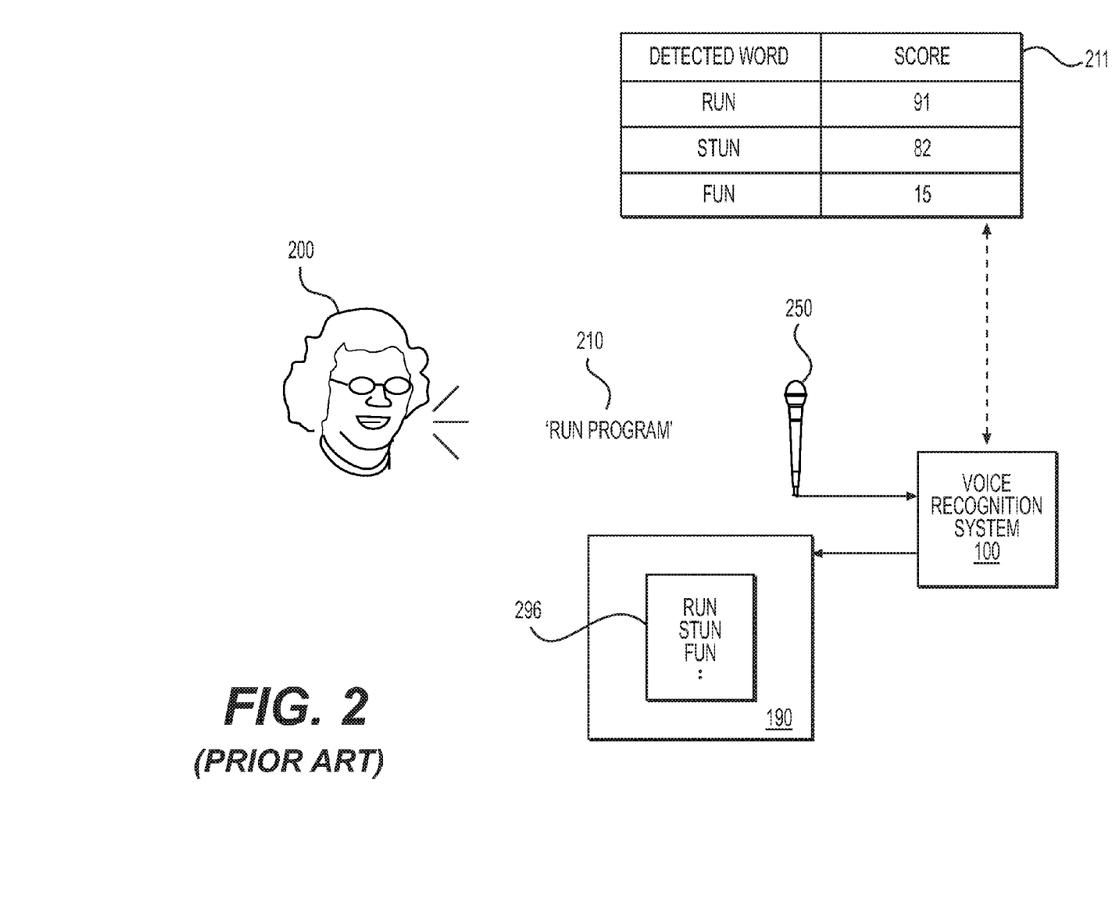
FIG. 2 illustrates an example of a user employing the system of FIG. 1 employing known disambiguation schemes implemented in the prior art.

FIG. 1 illustrates an example of a system 100 employing disambiguation according to the prior art. FIG. 2 illustrates an example of a user 200 employing the system 100 employing known disambiguation schemes implemented in the prior art.

The voice recognition system 100 is coupled to a data store 150. The data store 150 may be integrated into the system 100, but is shown separately to illustrate certain concepts, such as applying a score data 156 to each of the detected words 155.

The voice recognition system 100 is configured to receive a voice command 110. As shown in FIG. 2, user 200 vocalizes the command 'Run Program' 210 via a microphone 250 (or any electronic device capable of receiving vocal commands). As such, command 110 may be input to system 100 for further processing.

The voice recognition system 100 is configured to process the received voice command 110 and retrieve detected words 155 based on said processing. The detection may employ known digital signal processing techniques commonly employed.

In addition to retrieving the detected words 155, the voice recognition system 100 also retrieves a score (contained in score data 156) associate with each of the detected words 155. Based on the voice recognition scheme employed, each of the detected words 155 may be assigned a score based on a prediction of whether the detected word matches the voice command.

The ranked detected words 111 may be communicated to a secondary system (such as a display 190) to display the detected words 155. The ranked detected words 111 order the detected words 155 in a manner corresponding to the score data 156. Thus, the detected words that correlate to a higher score may be displayed first.

This function is shown in FIG. 2. The display 190 includes a window 290 displaying the ranked detected words 111 based on a command 210. As shown, the screen of disambiguation is presented based on a hypothetical application of voice recognition system 100, where each of the words shown in window 290 are associated with a score (based on sample a lookup table 211 is provided).

As shown, even though 'run' is vocalized by user 200, the voice recognition system 100 determines that the user 200 may be saying the three options shown in lookup table 211. While for a user with good vocal clarity and/or in an ideal audio situation, the first and highest scored detected word may be the right one, with other users, this may not be the case.

Thus, employing the voice recognition system 100 described above, the user 200 may vocalize the command 211 'Run Program' and receive a window 290 showing the disambiguation shown (Run', 'Stun', and 'Fun'). After which, the user may select through another input technique or method which the correct one of the options shown in window 290 corresponds to user 200's initial vocal command.

SUMMARY

The following description relates to a system for dynamically adjusting a voice recognition system.

The systems include a data store comprising a non-transitory computer readable medium storing a program of instructions for the implementation of the sorted linked list; a processor that executes the program of instructions, the instruction comprising the following steps: receiving a voice command from the voice recognition system; retrieving a plurality of detected words based on the voice command; retrieving a plurality of scores correlated to each of the plurality of detected words; and selectively displaying a disambiguation window containing a subset of the plurality of detected words based on a first method.

In another example, the system also includes performing a check for disambiguation, in response to the plurality of detected words only consisting of one word, bypassing the displaying of the disambiguation window; and in response to the bypassing of the displaying, executing a command based on the one word associated with the plurality of detected words.

In another example, the system also includes disregarding a set of the plurality of detected words below a predetermined score; determining whether the non-disregarded set of the plurality of detected words is greater than one, and in response to the determination being false, bypassing the displaying of the disambiguation window; in response to the determination being true, performing a second method to determine the selection threshold; obtaining a difference between a first highest scored one of the plurality of detected words and a second highest scored one of the plurality of detected words, in response to the difference being greater than the determined selection threshold, bypassing the displaying of the disambiguation window; and in response to difference being greater than the determined selection threshold, displaying the disambiguation window with the plurality of detected words with a respective score within the determined selection threshold.

In another example, the system also includes receiving a lookup table with a plurality of predetermined trigger words; determining whether the highest scored one of the plurality of detected words matches with multiple entries from the lookup table, with the matching being defined as one of the detected words being the same as one of the predetermined trigger words by at least a matching predetermined threshold; in response to the determination of whether the highest scored one of the plurality of detected words matches with multiple entries from the lookup table being true, determining the selection threshold value to be greater than a default selection threshold value, and in response to the determination of whether the highest scored one of the plurality of detected words matches with multiple entries from the lookup table being false, determining the selection threshold value is a default selection threshold value.

In another example, the system also includes receiving a list of predetermined trigger words; determining whether the plurality of detected words is above a predetermined number; in response to the determination of whether the plurality of detected words is above a predetermined number being false, determining the selection threshold is a default selection threshold; in response to the determination of whether the plurality of detected words is above a predetermined number being true, determining whether any of the predetermined number of highest scored of the plurality of detected words match any of the list of predetermined trigger words by a matching score over a predetermined threshold, in response to being true, determining the selection threshold is a default selection threshold; and in response to being false, increasing the determined selection threshold by a predetermined amount.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIGS. 8(a) and (b) illustrate an example implementation of the system of FIG. 3 with multiple users with varying vocal clarity.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

While lines are shown connected to the various components, any method/technique known may be implemented to communicate between the signals. For example, the signals may be communicated directly via wires, wirelessly, or through a centralized network router.

As explained in the Background section, voice recognition systems, such as system 100, allow a user to enter a vocal command, and have said vocal command detected as a trigger to either show up on a display, activate a function for an electronic system, or both.

As also noted, these systems are often times imperfect and have to deal with situations that are not within the system 100 implementers control. For example, variations in accents, dialects, equipment, and environment may lead to situations where the detecting the vocal command is ultimately frustrated and made more difficult.

Systems and methods have been proposed to provide disambiguation. However, these systems of disambiguation are often times not necessary based on the context and the specific instance.

Disclosed herein are methods and systems for dynamically adjusting a voice recognition system based on learned behavior. By employing the aspects disclosed herein, the disambiguation provided becomes more robust and reactionary, and as such, a better and more accurate user experience is achieved.

Figure 3:
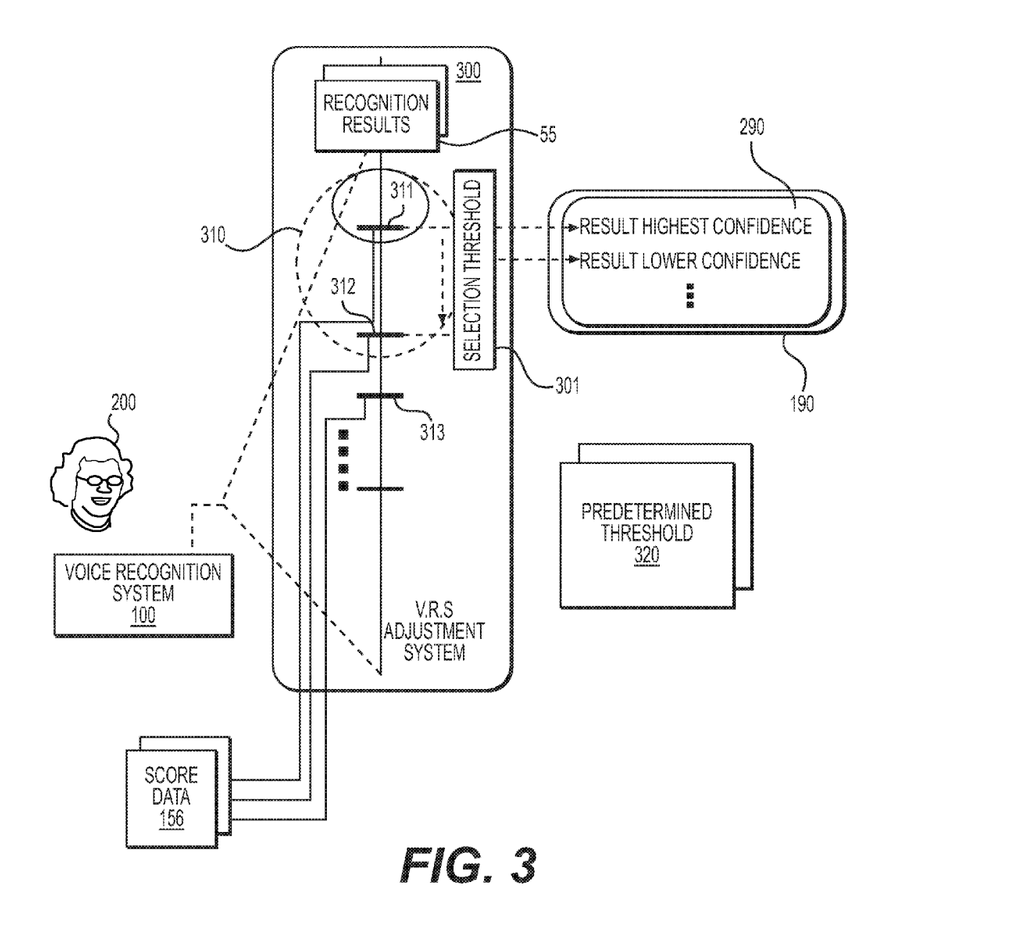
FIG. 3 illustrates a high-level implementation of a system for dynamically adjusting a voice recognition system.

FIG. 3 illustrates a high-level implementation of a system 300 for dynamically adjusting a voice recognition system 100. The voice recognition system 100 is significantly similar to the system 100 described in FIGS. 1 and 2, and as such, a detailed description will be omitted.

As shown in FIG. 3, everything is similar to FIGS. 1 and 2, except the inclusion of system 300. System 300 will be described with greater detail below with the descriptions of FIGS. 4 through 7.

Figure 4:
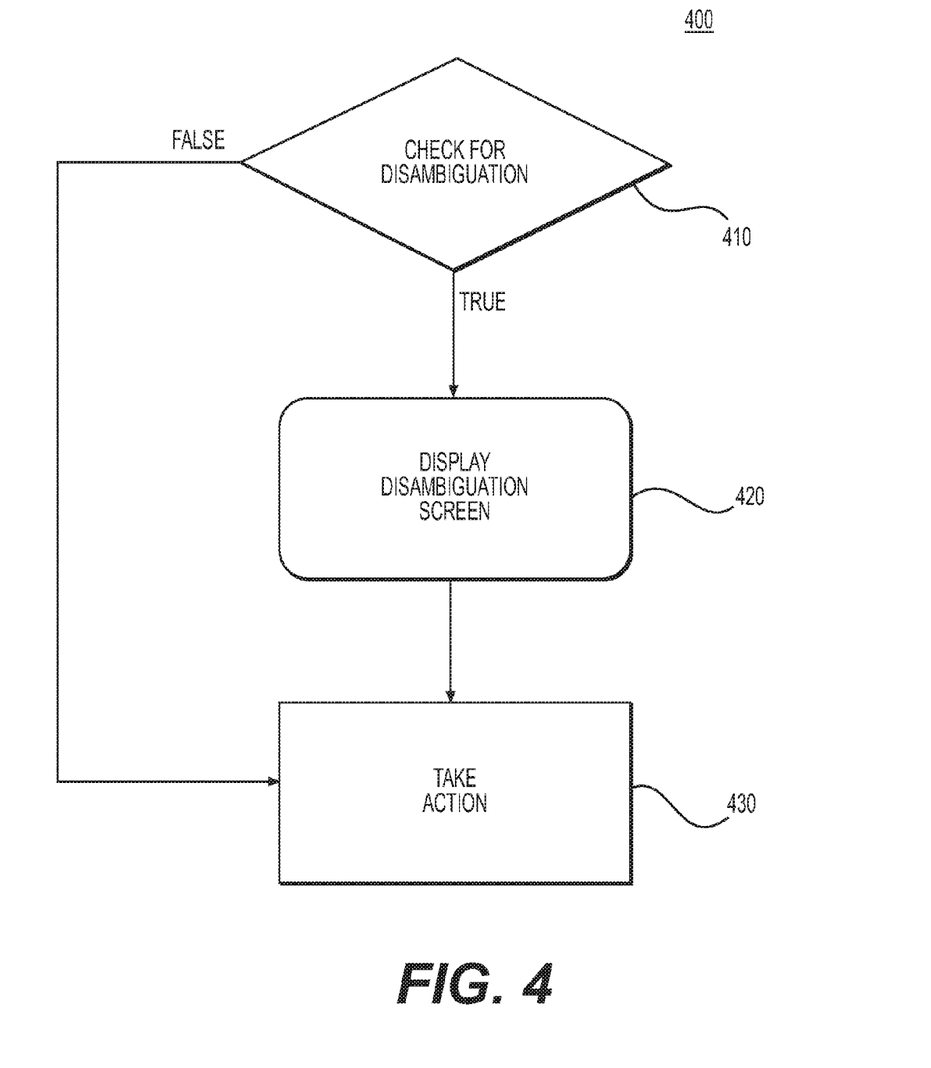
FIG. 4 illustrates the method of operation of system in FIG. 3.

FIG. 4 illustrates the method 400 of operation of system 300. Method 400 employs the various aspects disclosed and shown in FIGS. 5-7, and the interplay between all the operations will be described in greater detail below.

The method 400 assumes that a command 110 has been received via the system 100. The command 110 generates data 155 and 156 as described above. This information is propagated to system 300, which performs the operation of 410, where disambiguation is checked for. A check for disambiguation involves determining whether more than one detected word 155 exists. In this situation where there is more than one word, the method 400 may proceed to operation 420 (contingent on other factors explained in FIG. 5), in which the disambiguation screen is displayed.

Alternatively, when there is not more than one word, the method 400 proceeds to operation 430, where the command 110 is automatically acted upon. For example, if the command 110 is associated with the instigation of an electronic system, the electronic system may be configured to operate a command. Alternatively, if the command 110 is associated with displaying a word or icon, said display also occurs.

Figure 5:
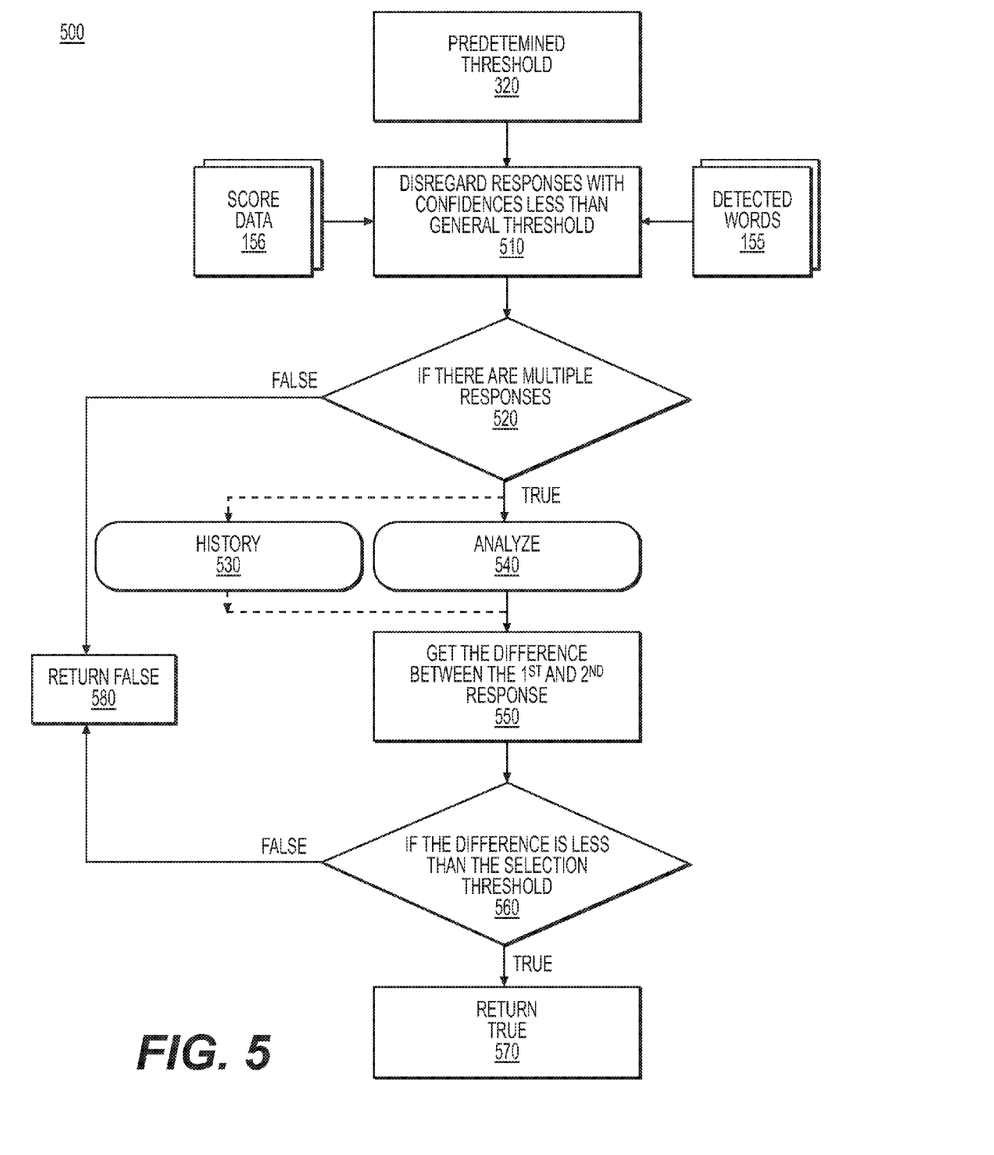
FIG. 5 illustrates a method of performing the check for disambiguation of the method shown in FIG. 4.

FIG. 5 illustrates a method 500 than explains the determination in operation 410.

In operation 510, the subset of detected words 155 is chosen based on all words associated with the command 110 that fall under a score based on a predetermined threshold. As explained, each of the detected words may be associated with a score or metric associated with how similar the word is to the command 110 based on the voice recognition system 100. As such, score data 156 and the detected words 155 are input into operation 510.

As explained in FIG. 4, in operation 520, a determination is made as to whether there is more than one word that satisfies the predetermined threshold established in operation 510 (shown in FIG. 3 as a predetermined threshold 320). If no, the method 500 proceeds to operation 580, where a value of 'false' is returned to operation 410.

Figure 6:
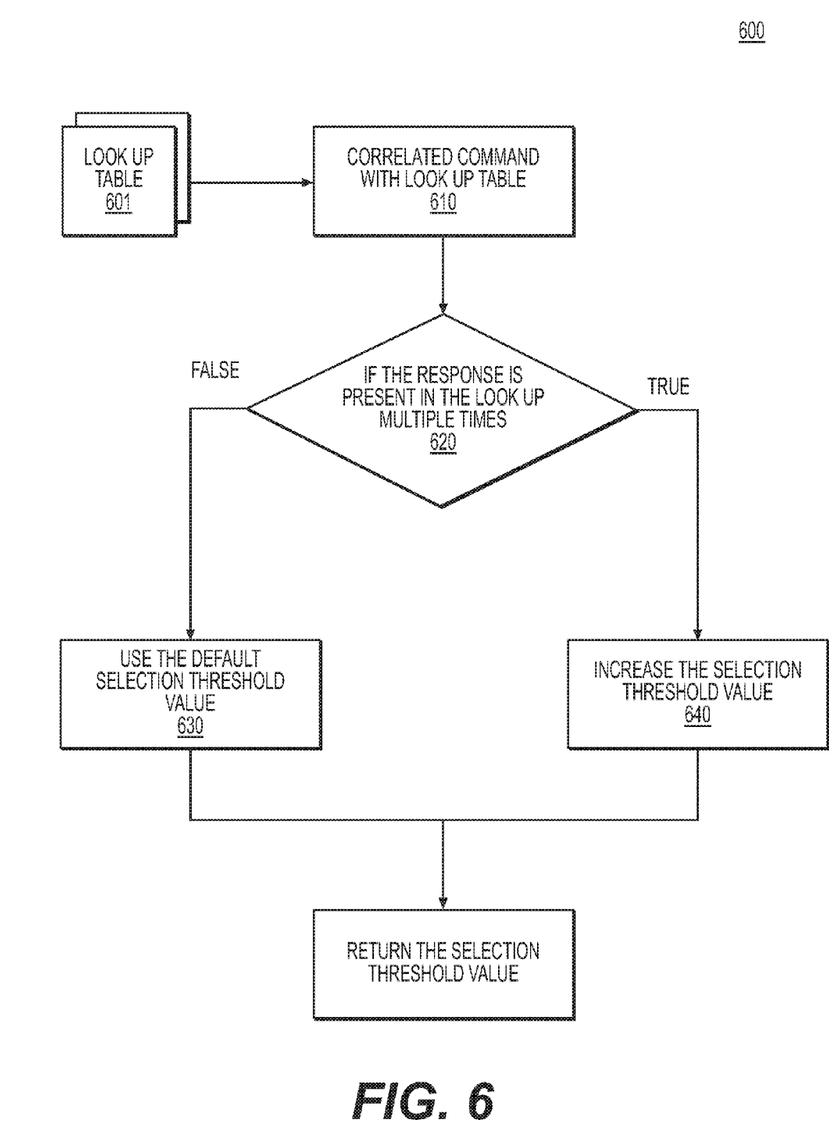
FIG. 6 illustrates a first method of determining the selection threshold for the methods shown in FIGS. 4 and 5.
Figure 7:
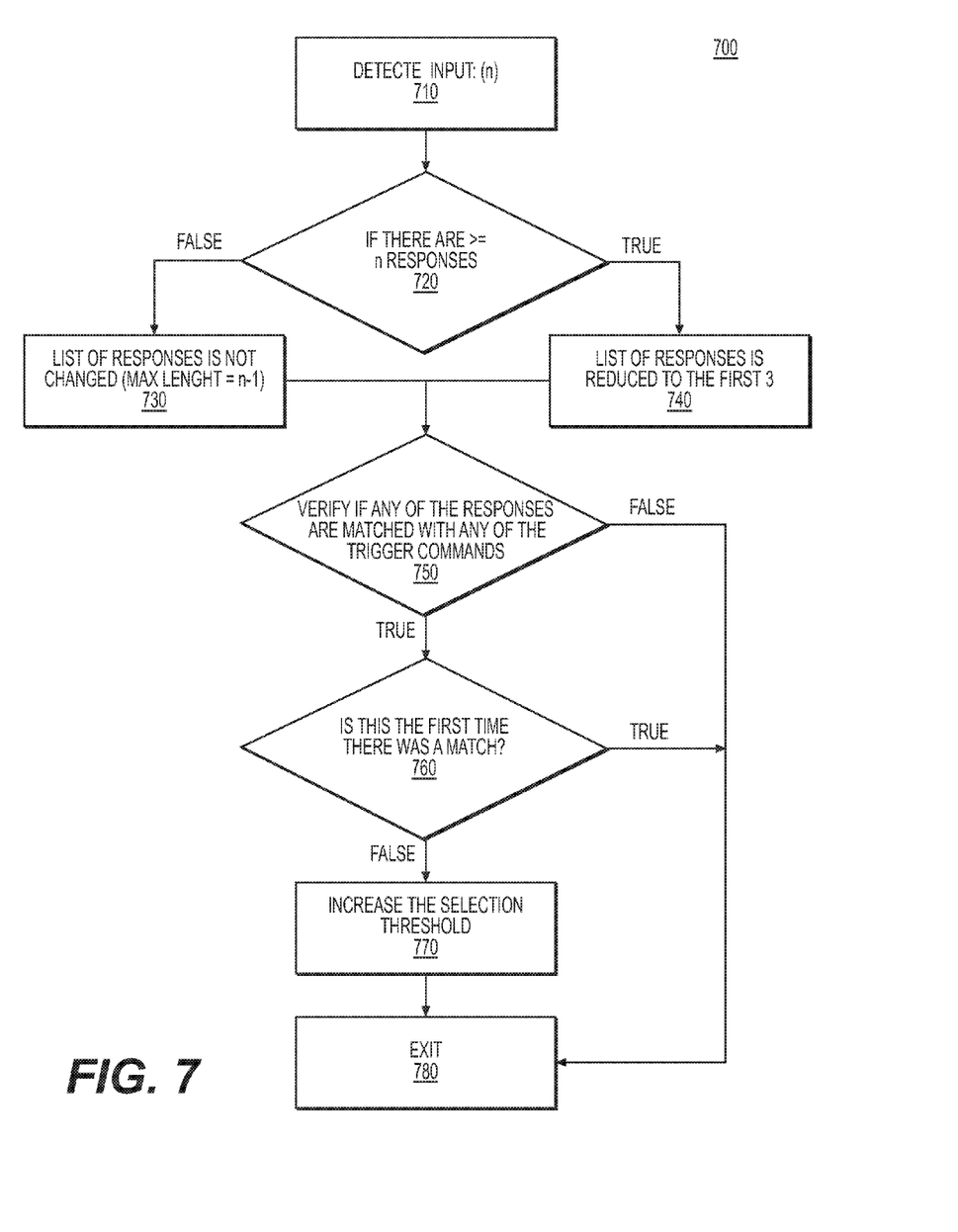
FIG. 7 illustrates a second method of determining the selection threshold for the methods shown in FIGS. 4 and 5.

If yes, the method 500 proceeds to either operation 530 (a first embodiment), or either operation 540 (a second embodiment). While both embodiments are shown as separate, an implementer may incorporate the subject matter of both embodiments into a single implementation. FIGS. 6 and 7 illustrate operations 530 and 540 in more detail, and these methods will described in greater detail below.

In operation 550, a score differential between the highest scored detected word and the second highest scored detected word is ascertained. This difference is stored for later usage by method 500.

In operation 560, in response to the difference ascertained being less than the selection threshold obtained in either operations 530 or 540, method 500 proceeds to operation 580, where a 'false' value is returned to operation 410.

In response to the determination in operation 560 indicating that the difference ascertained is more than the selection threshold obtained in either operations 530 or 540, method 500 proceeds to operation 570. In operation 570, the value 'true' is returned to operation 410.

Referring back to FIG. 4, if a true value is received, a disambiguation screen is displayed, and is further displayed based on the selection threshold.

As shown in FIG. 3, a sample dynamic selection threshold 310 is provided (with the calculation of said selection threshold 310 described in operations 530 and 540). The dynamic selection threshold 310 is shown to cover detected words, which are graphically indicated by lines 311, 312, and 313. Each word is associated with a score, with the higher the word appearing in system 300 indicating a higher score. As shown, since detected words 311 and 312 each fall within the dynamic selection threshold 310, detected words 311 and 312 are shown on the disambiguation window 290 (via display 190)—in the order of highest score to lowest score.

Also shown in system 300 is detected word 313, which is not shown in the disambiguation window 290. Based on the aspects disclosed herein, detected word 313 is not within the selection threshold 310.

In operation 610, a lookup table 601 is employed. A lookup table 601 contains all the 'trigger' words associated with an operation of an electronic system associated with the interface in which voice recognition system 100 and display 190 are coupled to and associated with. For example, there may be a total of 'N' number commands pre-associated with a task (this list may correspond to the detected words 155). Additionally, in operation 610, the command 110 is correlated to at least one of the trigger words in the lookup table. The correlation may be done by determining which of the trigger words match the command 110 with a score over a predetermined threshold.

In operation 620, a determination is made to how many of the trigger words correlate to the command 110 over the predetermined threshold employed for a matching score. If the number is one, the method 600 proceeds to operation 630 where the default selection threshold 301 is employed.

In operation 640, which is proceeded to in response the number of trigger words correlating to the command 110 being multiple (i.e. more than one), the selection threshold value 301 is altered to a new size (correlating to dynamic selection threshold 310). The increase in size may be of a certain predetermined increase amount. As such, the result of operation 640 being proceeded to leads to a larger dynamic selection threshold 310.

In operation 650, the value of the newly set (or maintained) selection threshold is returned to method 500.

FIG. 7 illustrates an alternative embodiment for dynamically determining a selection threshold 301. In operation 710, a list of detected words 155 is retrieved correlating to scores over a predetermined threshold.

In operation 720, a determination is made as to whether the number of detected words 155 satisfying the condition in operation 710 is over 'N' (which is a predetermined number, which may correlate to the maximum number of words displayable on a disambiguation window 290). In response to not being over 'N', the method 700 proceeds to operation 730.

In operation 730, the list of detected words 155 corresponds to the list of words detected in operation 710.

If the determination in operation 720 is true, the method 700 proceeds to operation 740, where the list of words is reduced to the first 'N' responses (i.e. the responses with the highest scores).

In operation 750, verification is performed as to whether any of the responses match with any trigger commands associated with the operation of an electronic system associated with the display 190. If the answer is false, the method 700 may proceed to exit 780. Although not shown, the method 400 and 500 may also be exited as well, with a display saying 'voice command' not recognized.

Operation 750 may iteratively increase the subset of detected words 155 analyzed if the first list ascertained in operation 740 does not contain a match between any known trigger words and the detected words. This determination is performed in operation 760.

In operation 760, if it is determined that at least one of the detected words 155 match a trigger word, and said matching occurs in the list of detected words 155 not within the first 'N' words (as determined in operation 740), the selection threshold 301 is increased by a predetermined amount. As such, the dynamic selection 310 threshold is larger, and likely to retrieve more detected words 155 for a disambiguation window 290.

Figures 8A, 8B:
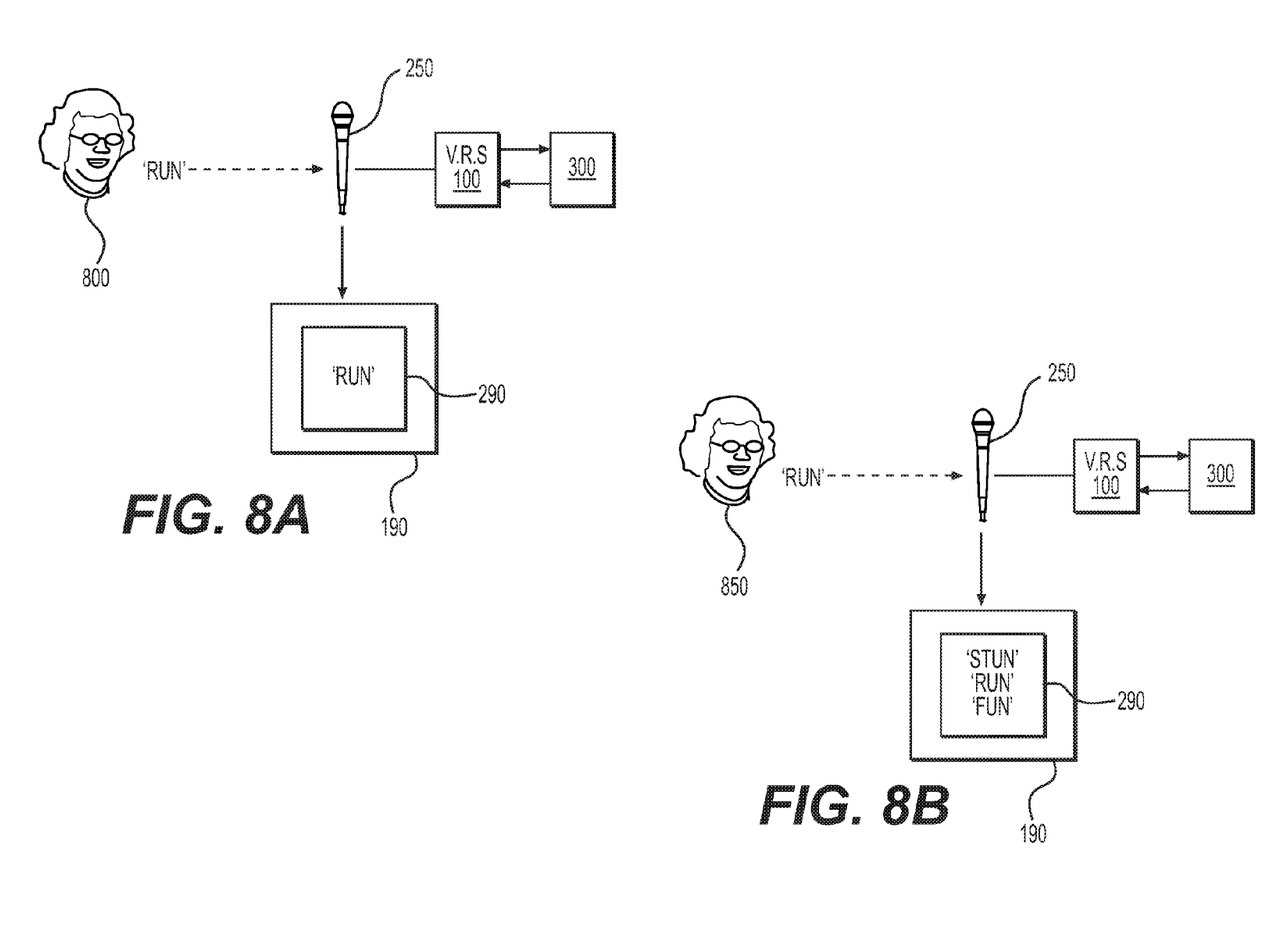

FIGS. 8(a) and (b) illustrate an example implementation of the system 300 shown above (employing either embodiment described herein). In FIG. 8(a), a user 800 is shown with good vocal clarity. The user 800 is shown vocalizing the command 'Run' (command 110). As such, when this is input into system 100 implemented with system 300, only one instance is shown on the disambiguation window 290. Alternatively, if the systems may automatically execute a command associated with command 110, as there appears to be only one option.

In FIG. 8(*b*), a user 850 with a poor vocal clarity is shown. Accordingly, when the user 850 vocalizes command 110, the disambiguation window 290 is configured to display multiple options for the user 850 to select.

Certain of the devices shown in the figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 4-7. The disclosed devices, components, and systems contemplate using or implementing any suitable technique for performing the steps illustrated in these figures. Thus, FIGS. 4-7 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for dynamically adjusting a voice recognition system, comprising:
   a data store comprising a non-transitory computer readable medium storing a program of instructions for the implementation of the sorted linked list;
   a processor that executes the program of instructions, the instruction comprising the following steps:
      receiving a voice command from the voice recognition system;
      retrieving a plurality of detected words based on the voice command;
      retrieving a plurality of scores correlated to each of the plurality of detected words; and
      selectively displaying a disambiguation window containing a subset of the plurality of detected words based on a first method;
   wherein the first method comprises:
      performing a check for disambiguation, in response to the plurality of detected words only consisting of one word, bypassing the displaying of the disambiguation window; and
      in response to the bypassing of the displaying, executing a command based on the one word associated with the plurality of detected words;
   wherein the performing the check for disambiguation comprises the following steps:
      disregarding a set of the plurality of detected words below a predetermined score;
      determining whether the non-disregarded set of the plurality of detected words is greater than one, and
      in response to the determination being false, bypassing the displaying of the disambiguation window;
      in response to the determination being true,
         performing a second method to determine the selection threshold;
         obtaining a difference between a first highest scored one of the plurality of detected words and a second highest scored one of the plurality of detected words,
            in response to the difference being greater than the determined selection threshold, bypassing the displaying of the disambiguation window; and
            in response to difference being greater than the determined selection threshold, displaying the disambiguation window with the plurality of detected words with a respective score within the determined selection threshold,
      wherein the second method comprises:
      receiving a lookup table with a plurality of predetermined trigger words;
      determining whether the highest scored one of the plurality of detected words matches with multiple entries from the lookup table, with the matching being defined as one of the detected words being the same as one of the predetermined trigger words by at least a matching predetermined threshold;
      in response to the determination of whether the highest scored one of the plurality of detected words matches with multiple entries from the lookup table being true, determining the selection threshold value to be greater than a default selection threshold value, and
      in response to the determination of whether the highest scored one of the plurality of detected words matches with multiple entries from the lookup table being false, determining the selection threshold value is a default selection threshold value.

2. A system for dynamically adjusting a voice recognition system, comprising:
   a data store comprising a non-transitory computer readable medium storing a program of instructions for the implementation of the sorted linked list;
   a processor that executes the program of instructions, the instruction comprising the following steps:
      receiving a voice command from the voice recognition system;
      retrieving a plurality of detected words based on the voice command;
      retrieving a plurality of scores correlated to each of the plurality of detected words; and
      selectively displaying a disambiguation window containing a subset of the plurality of detected words based on a first method;
   wherein the first method comprises:
      performing a check for disambiguation, in response to the plurality of detected words only consisting of one word, bypassing the displaying of the disambiguation window; and
      in response to the bypassing of the displaying, executing a command based on the one word associated with the plurality of detected words;
   wherein the performing the check for disambiguation comprises the following steps:
      disregarding a set of the plurality of detected words below a predetermined score;
      determining whether the non-disregarded set of the plurality of detected words is greater than one, and
      in response to the determination being false, bypassing the displaying of the disambiguation window;
      in response to the determination being true,
         performing a second method to determine the selection threshold;
         obtaining a difference between a first highest scored one of the plurality of detected words and a second highest scored one of the plurality of detected words,
            in response to the difference being greater than the determined selection threshold, bypassing the displaying of the disambiguation window; and
            in response to difference being greater than the determined selection threshold, displaying the disambiguation window with the plurality of detected words with a respective score within the determined selection threshold,
      wherein the second method comprises:
      receiving a list of predetermined trigger words;
      determining whether the plurality of detected words is above a predetermined number;
      in response to the determination of whether the plurality of detected words is above a predetermined number being false, determining the selection threshold is a default selection threshold;
      in response to the determination of whether the plurality of detected words is above a predetermined number being true,
         determining whether any of the predetermined number of highest scored of the plurality of detected words match any of the list of predetermined trigger words by a matching score over a predetermined threshold, in response to being true, determining the selection threshold is a default selection threshold; and in response to being false, increasing the determined selection threshold by a predetermined amount.

\* \* \* \* \*